Oct. 21, 1969
W. J. KUDLATY
3,473,662
AIR-OPERATED FILTERING SYSTEM
Filed Nov. 13, 1967
2 Sheets-Sheet 1
fig.1.
fig.2.
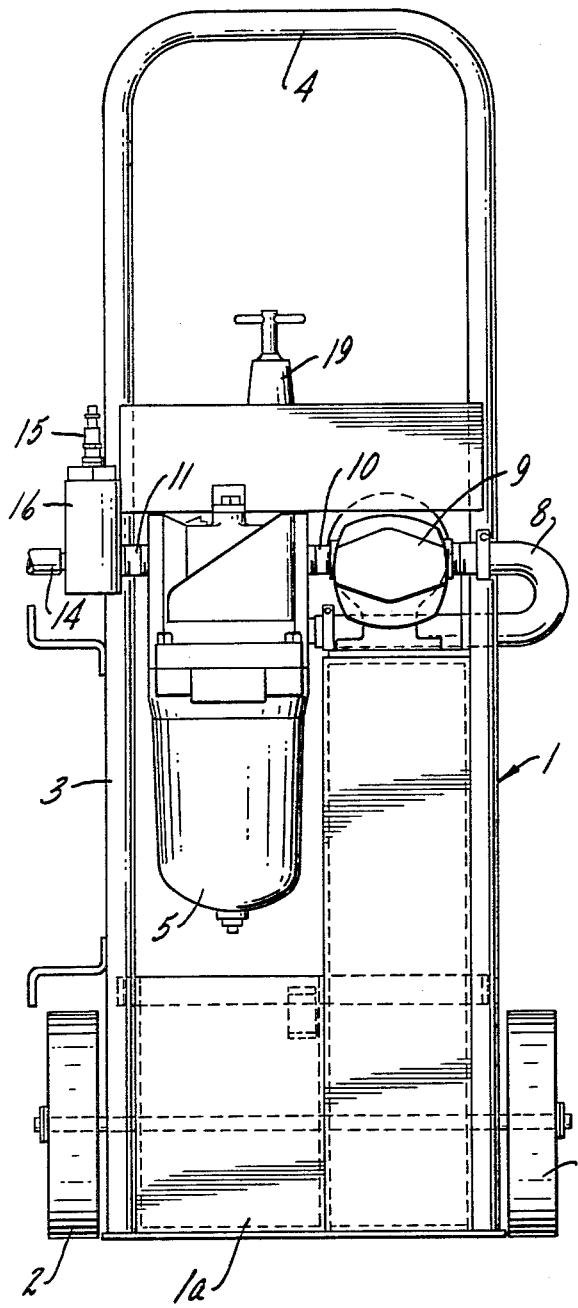
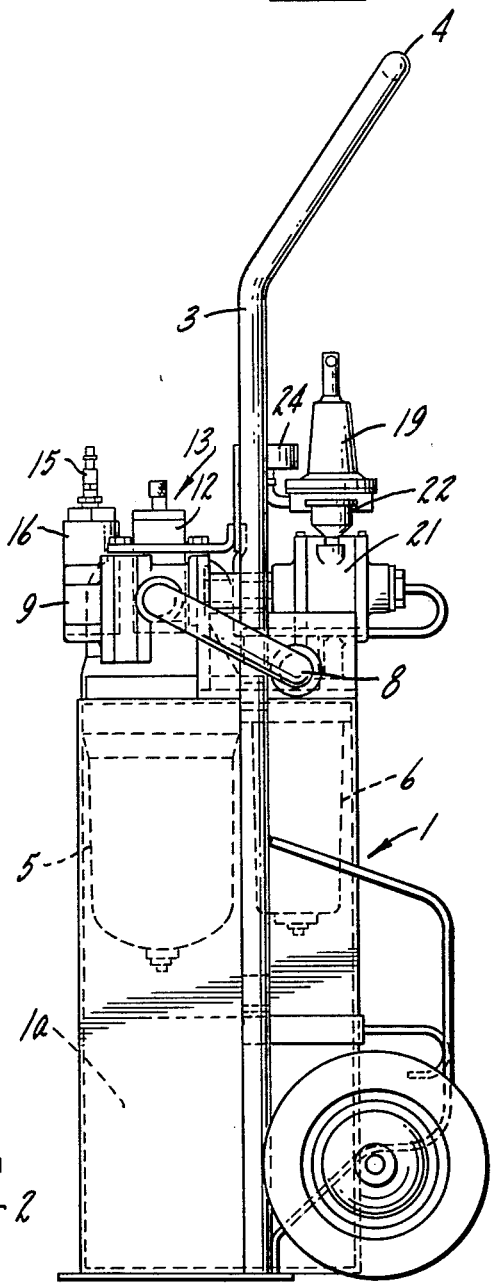
INVENTOR.
Walter J. Kudlaty,
BY Parker & Carter
Attorneys.

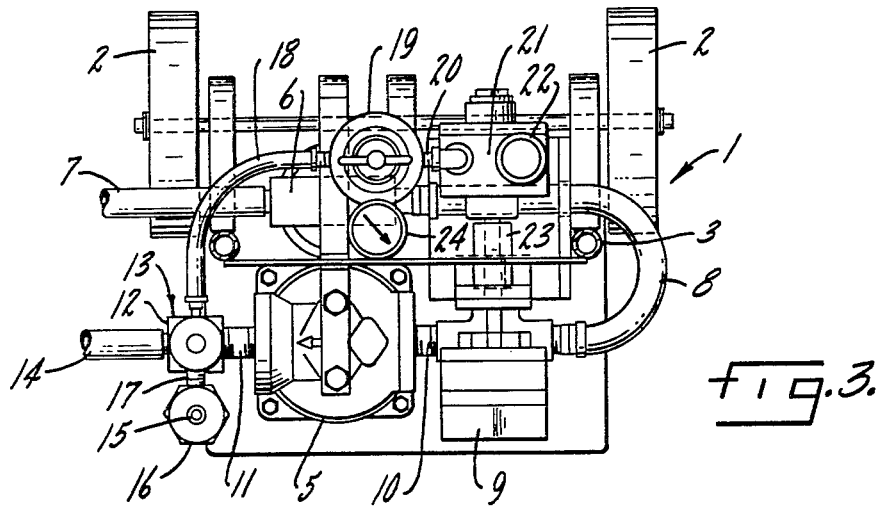
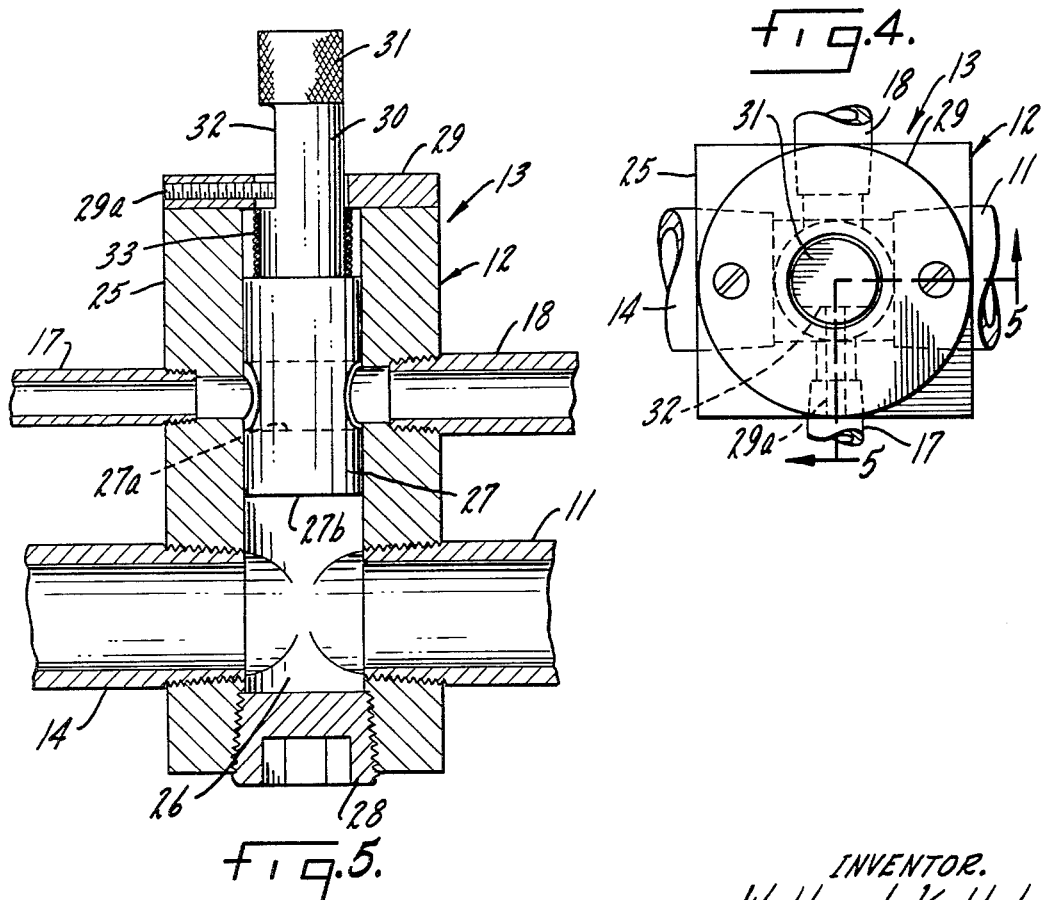

United States Patent Office 3,473,662
Patented Oct. 21, 1969

3,473,662
AIR-OPERATED FILTERING SYSTEM
Walter J. Kudlaty, Elmhurst, Ill., assignor to Marvel Engineering Co., Chicago, Ill., a corporation of Illinois
Filed Nov. 13, 1967, Ser. No. 682,337
Int. Cl. B01d 35/14, 23/20
U.S. Cl. 210—100          6 Claims

ABSTRACT OF THE DISCLOSURE

A filter system incorporating an air-operated motor driving a liquid pump and an automatic control valve responsive to liquid pressure and governing the operation of said air motor.

SUMMARY OF THE INVENTION

A filtering system incorporating a filter media, a liquid pump delivering liquid to said media for filtering of said liquid, an air-operated motor in driving connection with said pump, and a control valve in the air line to said air motor, said valve communicating with said liquid after the same has been filtered and responsive to the pressure of said filtered liquid automatically to activate and deactivate said air-operated motor.

This invention relates to filtering systems and has particular relation to a portable, air-operated filtering system.

One purpose of the invention is to provide a compact assembly of maximum manual portability and effectiveness.

Another purpose is to provide a filtering assembly of maximum safety.

Another purpose is to provide a filtering system automatically effective to cease operation in response to contamination of the filter media employed therein.

Another purpose is to provide a filtering assembly automatically effective to cease operation in response to diminution of a supply of liquid to be filtered.

Another purpose is to provide a filtering assembly and a means automatically effective to control the filtering operation thereof in response to pre-determined pressure differentials in the liquid being filtered.

Another purpose is to provide a filtering system effective to preclude by-passing and delivery of unfiltered liquid.

Another purpose is to provide a control valve for filtering systems incorporating a housing and a single valve element yielding urged into a position precluding operation of its associated system and urge into a position producing such operation in response to a predetermined pressure in the liquid being filtered.

Another purpose is to provide a filtering system control valve operable manually and in response to pressure differentials in the liquid being filtered.

Other purposes will appear from time to time during the course of the specifications and claims.

The invention is illustrated more or less diagrammatically in the accompanying drawings wherein:

FIGURE 1 is a front view of the assembly of the invention;

FIGURE 2 is a side view thereof;

FIGURE 3 is a top view thereof;

FIGURE 4 is a top view of the control valve on an enlarged scale;

FIGURE 5 is a cross-sectional view on the line 5—5 of FIGURE 4 of the control valve with the air passages rotated 90° out of position.

Like parts are indicated by like numerals throughout the specifications and drawings.

Referring now to the drawings, and particularly to FIGURE 1, the numeral 1 generally designates a portable cart having ground contacting wheels 2 and an upstanding frame 3 incorporating a handle portion 4. Mounted on frame 3 is a filtering structure which may consist of a downstream filter member 5 and an upstream filter member 6. It will be understood that the filter members 5, 6 may take a variety of forms without departing from the nature and scope of the invention. In each of the members 5, 6 a filter element (not shown) is positioned in a housing and liquid entering the housing is forced through such filter element and delivered thereafter from said housing in known manner.

A suitable inlet hose 7 will be connected to a source (not shown) of liquid to be filtered for delivery to the inlet of the filter member 6. Thereafter the fluid leaving member 6 is conducted by a suitable conduit such as the hose portion 8, to a liquid pump 9, it being understood that the pump 9 is effective to draw the liquid from said supply through conduit 7, housing 6 and the filter media therein and through conduit 8. From the pump 9, the liquid to be filtered is directed, as by conduit portion 10 into the filter member 5. After passing through the filter element within member 5, the liquid thus filtered is directed as by conduit portion 11, into a housing 12 of control valve 13. From the housing 12 the filtered fluid is directed as by hose or conduit 14 to a suitable point of use.

Indicated at 15 is an inlet air hose connector fitting for delivery of a supply of air under pressure to an air filter element (not shown) within an air filter housing 16. From the housing 16, air is directed by conduit portion 17 through the housing 12 of control valve 13. From the housing 12, said air is directed by conduit 18 through a suitable air pressure regulator 19 and thence, as by conduit portion 20, to an air motor 21. Indicated at 22 is an air muffler exhaust for the motor 21. Motor 21 is connected by a suitable flexible drive shaft connection 23 with the pump 9. An appropriate air pressure gauge 24 is in communication with regulator 19.

Referring now to FIGURE 5, it will be seen that the housing 12 of valve 13 comprises a substantially rectilinear, elongated valve body 25, having an axial chamber 26 therein. Slidable in chamber 26 is a valve member 27 having a passage 27a immediate its ends and having its opposite circumferential end portions in sliding engagement with the inner wall surface defining chamber 26. The lower end, as the parts are shown in the drawing, of chamber 26 is closed by plug 28. The opposite end of chamber 26 is closed by a cover or spring retainer cap 29 through which a valve member extension 30 extends. Extension 30 has an upper or outer knurled end portion 31. A portion of the circumferential surface of extension 30 is flat as indicated in 32 and a set screw 29a on cap 29 engages the flat surface 32. A spring 33 surrounds extension 30 and engages the inner surface of cap 29 and an opposed annular surface of the valve member 27, extension 30 being of reduced outer diameter with respect to the diameter of valve number 27. Air inlet 17 communicates with chamber 26 in planar alignment with a corresponding point of communication with air outlet conduit 18. At laterally aligned points beyond spring 33 from the point of communication of air conduits 17, 18 with chamber 26, the liquid conduits 11 and 14 communicate with chamber 26. It will be observed that the conduits 11, 14 are thus positioned to deliver liquid to the entire planar end surface 27b of valve member 27.

Whereas there has been described a suitable assembly and arrangement of parts, it will be understood that variations may occur to those skilled in the art without departing from the nature and scope of the invention.

The use and operation of the invention are as follows:

The cart 1 is wheeled into a suitably convenient position and the hose 7 is connected to the suitable source of supply of liquid to be filtered. The absence of electrical elements renders the assembly safe for use adjacent fuels, aircraft and similar locations. The hose or conduit 14 is connected to a point of use or storage for filtered liquid. It will be understood that, in some instances, the hose or conduit 7 may be connected to the outlet of a machine or storage container of liquid and that the hose or conduit 14 may be connected at another point to the same machine or container, the rights of the assembly of the invention being thus employed to remove, clean and return said liquid from and to such machine or container.

A bin 1a may serve as a conduit storage area when the system is not in use and as a drain reservoir when filter elements are removed from members 5, 6. Reserve filter elements may be stored on cart 1 adjacent bin 1a.

A source of air under pressure is connected to fitting 15 and manually operable handle portion 31 of the extension 30 is manually raised to move valve member into the position shown, for example, in FIGURE 5 and to hold it there momentarily. Air is thus permitted to pass from the air filter 16, about the intermediate reduction 27a of member 27, and through conduit 18, regulator 19 and conduit 20 to air motor 21 to operate the same.

Operation of air motor 21, through the mediacy of drive shaft 23, operates pump 9 to draw the liquid through the prefilter member 6 and conduit 8 for delivery under pressure through conduit 10 to filter 5 and for delivery of the filtered liquid through conduit 11, valve housing 12 and conduit 14 for delivery to the desired point of use. The pre-filter member 6 serves as a protection to pump 9 against the delivery thereto of deleterious particles such as would affect the operation of pump 9. For example, the filter member 6 may include appropriate magnet elements to remove ferrous particles from the liquid to be filtered prior to delivery of said liquid to pump 9. It will be understood also that pump 9 may include therein a relief valve (not shown) to protect the pump 9 and the filter element in filter member 5 against the development of excessive pressures. Such a valve may be set, for example, in the order of 100 p.s.i.

The filtered liquid entering chamber 26 in valve 13 from conduit 11 is effective against the entire end surface 27b of valve 27 to urge the same against the spring 33 and into the position shown in FIGURE 5, thus retaining the valve member in set position and maintaining communication between air inlet conduit 17 and outlet 18 and thus maintaining delivery of air under pressure to motor 21 and continuing the operation of the filter system of the invention. Should there be a diminution in the supply of liquid through conduit 7 or a buildup of contaminants on the filter elements in filters 5 or 6, the pressure of filtered liquid delivered by conduit 11 to chamber 26 will diminish accordingly. When said last-named pressure diminishes below a level sufficient to resist the predetermined force of the relatively light spring 33, said spring will move valve 27 in a direction away from cap 29 and toward the conduits 11, 14, to position the full-diameter end portion of member 27 engaged by spring 33 in alignment with conduits 17, 18 and thus to break communication therebetween and thus to stop the operation of air motor 21 and pump 9. In such position the knurled end portion 31 of extension 30 will seat upon cap 29, the filtering operation of the system will cease and delivery of unfiltered fluid to conduit 14 will be precluded.

The operator then replaces the filter element in filters 5 or 6 or secures hose conduit 7 to a suitable source of supply and manually lifts portion 31 to reposition the valve 27 in the position shown, for example, in FIGURE 5 and to re-activate the filtering operation of the system of the invention.

I claim:

1. A filter system including a liquid pump, a liquid filter positioned to receive liquid under pressure from said pump, an air motor drivingly connected with said pump, an air conduit positioned for delivery of air under pressure to said air motor, a valve member in said air conduit and means for delivering filtered liquid from said filter to said valve member, said valve member having means effective to control delivery of air under pressure to said motor in response to predetermined pressures in said liquid delivered to said valve member.

2. The structure of claim 1 characterized by and including a pre-filter upstream of said pump.

3. The structure of claim 1 wherein said valve member comprises a valve housing, a valve element reciprocal in said housing, an end face of said valve member being exposed to said filtered liquid delivered to said valve housing, an extension on said valve member extending outwardly of said housing, and a yielding means urging said valve member against the action of said filtered liquid delivered to said housing.

4. A liquid filtering system including a liquid filter, a pump delivering liquid to said filter, and an air motor drivingly connected to said pump, a control valve including a housing, a valve member reciprocal in said housing, an air inlet in said housing, an air outlet in said housing, said outlet being connected to said air motor for delivery of operating air under pressure thereto, a liquid inlet in said housing connected to said filter, a liquid outlet in said housing, said valve member being yieldingly urged into a first position closing communication between said air inlet and said air outlet, said valve member being movable into a second position opening communication between said air inlet and said air outlet in response to the delivery of liquid under a predetermined pressure at said liquid inlet.

5. The structure of claim 4 characterized by and including an extension on said valve member extending outwardly of said valve housing and manually operable to move said valve housing from said first position into said second position.

6. A portable filtering assembly including a frame, ground-contacting elements rotatably mounted on said frame, a pre-filter member carried on said frame and having an inlet and an outlet, a liquid pump carried on said frame and having an inlet communicating with said pre-filter member outlet, said pump having an outlet, a downstream filter member carried on said frame and having an inlet communicating with said pump outlet, said downstream filter member having an outlet, an air-operated motor carried by said frame and a driving connection between said motor and said pump, a control valve carried on said frame and having an air outlet communicating with said motor, said valve having a liquid inlet communicating with said downstream filter outlet, said valve having an air inlet communicating with said air outlet and a liquid outlet communicating with said liquid inlet, a valve element in said control valve and yielding means urging said valve element into a first position closing communication between said air inlet and air outlet, said valve element being movable into a second position opening communication between said air inlet and air outlet in response to delivery of liquid to said control valve above a predetermined pressure level.

References Cited

UNITED STATES PATENTS

| | | | |
|---|---|---|---|
| 2,184,761 | 12/1939 | Wier | 210—100 |
| 2,499,494 | 3/1950 | Greer | 210—90 |
| 2,532,568 | 12/1950 | Myers. | |
| 3,325,010 | 6/1967 | Sackett | 210—90 |
| 3,404,779 | 10/1968 | Weathers | 210—97 |

REUBEN FRIEDMAN, Primary Examiner

J. ADEE, Assistant Examiner

U.S. Cl. X.R.

210—241, 258, 416